United States Patent
Kerisit et al.

(10) Patent No.: US 7,617,171 B2
(45) Date of Patent: Nov. 10, 2009

(54) PROCESS FOR THE ITERATIVE CONSTRUCTION OF AN EXPLANATORY MODEL

(75) Inventors: Jean-Marc Kerisit, Courbevoie (FR); Olivier Bousquet, Issy-les-Moulineaux (FR)

(73) Assignee: Intercim, Paris (FR)

( * ) Notice: Subject to any disclaimer, the term of this patent is extended or adjusted under 35 U.S.C. 154(b) by 189 days.

(21) Appl. No.: 11/106,275

(22) Filed: Apr. 14, 2005

(65) Prior Publication Data

US 2006/0235815 A1    Oct. 19, 2006

(51) Int. Cl.
G06F 17/00    (2006.01)
G06N 5/02    (2006.01)

(52) U.S. Cl. .............................. 706/47; 702/19; 703/11
(58) Field of Classification Search .................... 706/45, 706/46, 47; 707/1, 10; 514/221; 359/368
See application file for complete search history.

(56) References Cited

U.S. PATENT DOCUMENTS

| | | | |
|---|---|---|---|
| 5,410,634 A * | 4/1995 | Li | 706/62 |
| 6,625,500 B1 | 9/2003 | Li | |
| 2002/0128805 A1 | 9/2002 | Goldman et al. | |
| 2005/0198040 A1 * | 9/2005 | Cohen et al. | 707/10 |

* cited by examiner

*Primary Examiner*—David R Vincent
*Assistant Examiner*—Kalpana Bharadwaj
(74) *Attorney, Agent, or Firm*—Oblon, Spivak, McClelland, Maier & Neustadt, L.L.P.

(57) ABSTRACT

A process for iterative construction of an explanatory model including at least one rule calculated from a plurality of experiments, each of which rules is associated with at least one indicator of the quality of a corresponding rule including determining a rule, of a set of new experiments in an application space, conducting the new experiments to obtain the corresponding results, and calculating and optionally updating indicators of quality of the rule as a function of the experiments and of corresponding results.

19 Claims, 10 Drawing Sheets

FIG.1

| | Interest | Purity | Rel. Size | Robustness | Sensitivity | Complexity | Density | Volume |
|---|---|---|---|---|---|---|---|---|
| R003: round Size: 32 normal: 100% prolongation: 0% premature stop: 0% | 95.65% | 100% | 69.57% | 96.87% | 15.79% | 4 | 11.753 | 4.06% |

If chamber temperature in [ 26 ; 63.28
and average size in [ 2.4 ; 3.2
and core pressure in [ 280 ; 294
and internal pressure in [ 30.6 ; 35.1
then Status = normal

Rule Table

| Int | Name | Class | Interest | Purity | Size | Rel. Size | Robustness | Sensitivity | Complexity | Density | Volume |
|---|---|---|---|---|---|---|---|---|---|---|---|
| | Summary | | 95.20% | 100% | 25.12 | 80.07% | 90.19% | 6.37% | 5.375 | 14.609 | 7.05% |
| | R005 | normal | 96.28% | 100% | 38 | 78.26% | 98.55% | 2.7% | 4 | 22.959 | 2.34% |
| | R004 | normal | 95.01% | 100% | 34 | 73.91% | 97.99% | 11.9% | 4 | 3.428 | 14.81% |
| | R003 | normal | 55.65% | 100% | 32 | 69.57% | 96.87% | 0% | 4 | 11.753 | 4.06% |

□ Rule Table  □ Rule Comparison  □ Rule Slice  □ Rule / Samples

| Name | Keep | Controlled | Exp. Domain |
|---|---|---|---|
| Average days of work stoppage | ☐ | ✓ | [0 ; 5,04] |
| Length of cooling | ☑ | ✓ | [69 ; 217] |
| Core Material | ☑ | ✓ | SS-304, Al*, C; |
| Major modification | ☐ | ✓ | no ; yes |
| Scheme cool modifications | ☑ | ✓ | no ; yes |
| Social movements | ☐ | ✓ | no ; yes |
| Number of Coolers | ☑ | ✓ | 30 ; 40 |
| Strategic necessity | ☐ | ✓ | no ; yes |
| Number of subcontractors | ☑ | ✓ | [0 ; 4] |
| Number of initial stages | ☐ | ✓ | 1 ; 2 ; 3 |
| Technological level | ☑ | ✓ | ABB; Alsthom; |
| Interior partitions | ☑ | ✓ | 304ss;317ss; |

FIG. 6

Interactive Experiment Planning – Experiment generation

This step enables you to build your set of experiments.

Number of experiments

The new sequence will contain: [50] suggested experiments.

Search depth

Define the search depth of the experiment building: [Basic ▾]

[Compute]

Please note: you can stop at any time and obtain a valid set of experiments. Waiting until the end of the computation provides better solutions.

[<Back] [Next>] [Cancel] [Help]

FIG.8

| Experiment Domain | | |
|---|---|---|
| Variable ▲ | Controlled | |
| Meaning by local population | Yes | |
| Industrial architect | Yes | ALP; APL; BG&E; CPC; CPL; CYAPC; Coned |
| Nat. political changes | Yes | |
| Boiler | Yes | ACLF; BW; Balcke; Balcke/GHH; Bechtel; Bred |
| Cold climate | Yes | |
| Fuel | Yes | UO2 |
| Circuit complexity | Yes | |
| Cooling design | Yes | clf/sgg; dbl;doubsgg; icecond; lf; lf/mp; lf/s |
| Increase in personnel | Yes | |
| Construction data | Yes | |
| Cooling output | Yes | |

FIG.11

| Experiment Table | | | | | |
|---|---|---|---|---|---|
| \<Exp\> ▲ | Stability direction | Nat. political changes | Average size | Fuel | Cooling No. |
| EXP 000001 | no | Yes | 2.195 | 40 | 30 |
| EXP 000002 | no | Yes | 2.09 | 30 | 30 |
| EXP 000003 | Yes | Yes | 3.9 | 40 | 30 |
| EXP 000004 | no | Yes | 1.985 | 30 | 30 |
| EXP 000005 | Yes | Yes | 1.75 | 40 | 30 |
| EXP 000006 | Yes | Yes | 3.75 | 30 | 30 |
| EXP 000007 | Yes | Yes | 3.6 | 40 | 30 |
| EXP 000008 | no | Yes | 3.47 | 40 | 30 |
| EXP 000009 | no | Yes | 2.47 | 40 | 30 |
| EXP 000010 | no | Yes | 3.275 | 40 | 30 |
| EXP 000011 | Yes | Yes | 3.05 | 30 | 30 |

FIG.12

PROCESS FOR THE ITERATIVE CONSTRUCTION OF AN EXPLANATORY MODEL

FIELD OF THE INVENTION

This invention relates to construction of explanatory models, in particular for industrial processes requiring a large number of adjustments that are at times interdependent.

BACKGROUND

The construction of a model is generally divided into two phases, the first consisting of collecting a certain number of data interpreting the functioning of the process and the second consisting of analyzing this data to extract the information necessary for the definition of the model. The presence of a large number of adjustments renders these operations delicate. Moreover, it is impossible in the majority of real cases to perfectly characterize the functioning of a complex process. It is also quite impossible to test all the possible configurations of the adjustment parameters of such processes. Numerous works in the scientific literature concern the determination of a small number of configurations (of experiments) that can allow the total functioning of the process to be characterized at least approximately. The idea is that even an approximate characterization already permits the resolution of a certain number of practical problems.

Intuitively, an effective method consists in repeating several times the cycle of collection and analysis of data. In fact, the analysis of data becomes finer with more experiments conducted under diverse conditions, whereas the realization of these experiments brings all the more information the more precise the analysis and the constructed model are. To illustrate this fact, one example is an industrial process whose productivity is to be optimized by acting on a certain number of adjustments. The expert has a certain knowledge of this process right at the start that permits that expert to determine the most potentially interesting area for each of the adjustments. It is then necessary to perform experiments to optimize this adjustment. The productivity obtained can be measured for each possible configuration of these adjustments. When the possible configurations are too great in number and it is too expensive to test them all, the attempt can be made to determine the influence of each adjustment individually. However, this does not permit the perception of the coupling phenomena that can exist between the adjustments. It is therefore preferable to make all the adjustments vary at the same time but in a coordinated manner. Once the corresponding experiments have been carried out, the expert can refine comprehension of the process that is therefore determined by new experiments to be carried out to test the hypotheses that was formulated. It would therefore be advantageous to provide a system that aids the expert in this step. It is important that the system in question can interact with the expert in a natural and comprehensible manner.

U.S. Pat. No. 6,625,500 discloses a method consisting of generating and automatically realizing experiments in an iterative manner to optimize an industrial process. This method imposes the choice of a number of levels.

US 2002/0128805 discloses a method consisting of the development of a prediction model by automatically generating experiments and comparing their result with the initially calculated prediction.

Those two patents concern only linear or quadratic models with a quantitative output and therefore do not apply to the instance of models with a base of rules and in particular with a qualitative output. Moreover, those two patents aim to automate the entire process and therefore do not permit the integration of the expert knowledge at each cycle of use.

SUMMARY OF THE INVENTION

This invention relates to a process for iterative construction of an explanatory model including at least one rule calculated from a plurality of experiments, each of which rules is associated with at least one indicator of the Quality of a corresponding rule including determining a rule, of a set of new experiments in an application space, conducting the new experiments to obtain the corresponding results, and calculating and optionally updating indicators of quality of the rule as a function of the experiments and of corresponding results.

BRIEF DESCRIPTION OF THE DRAWINGS

FIG. 1 is a computer screen showing aspects of the system in accordance with the invention;

FIG. 6 is a computer screen showing an aspect of a module including a graphical assistant:

FIG. 8 is a computer screen showing a selection of additional parameters;

FIG. 11 is a computer screen of an experimental domain;

FIG. 12 is a computer screen of a table of experiments; and

DETAILED DESCRIPTION

Figure 2:
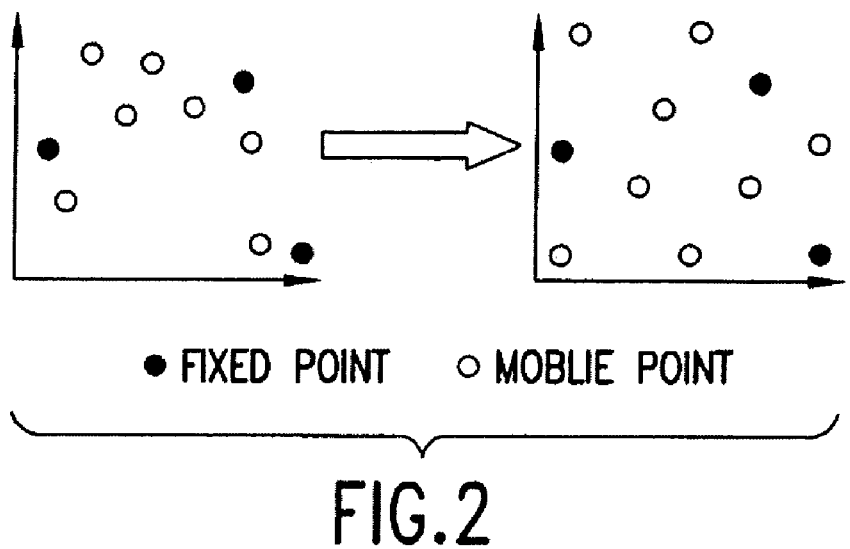
FIG. 2 is a pair of graphs showing distribution of points.

This invention addresses the disadvantages of the prior art by proving a process that permits the optimization of the construction of an explanatory model with an economy of experiments necessary to obtain pertinent rules that can be readily interpreted by an expert in the industrial process.

To this end the invention relates according to its most general meaning to a process for the iterative construction of an explanatory model constituted of at least one rule calculated from a plurality of experiments, each of which rules is associated with at least one indicator of the quality of the corresponding rule, characterized in that it comprises the following stages:

the determination of a rule, of a set of new experiments in the application space, the realization of these new experiments to obtain the corresponding results, and the calculation of the indicators of quality of the selected rule as a function of these experiments and of the corresponding results.

Furthermore, the explanatory rule or rules preferably comprise(s) at least one elementary premise consisting of a restriction of the domain of a variable.

The explanatory rule or rules preferably comprise(s) a logical combination of elementary premises and each elementary premise consists of a restriction of the domain of a variable.

The process advantageously comprises a supplementary stage of the construction of an explanatory model constituted of at least one rule from experiments performed so far.

The construction of the explanatory model may realized by an automatic system that proposes a set of rules to the expert, which supposes that the initial set of rules can be empty (before this system has been called).

Furthermore, the process may comprise a stage consisting of modifying the rules suggested by the system.

This process may be applied in an iterative manner until the obtention of satisfactory indicators of quality or at least until an indicator of quality improves between two cycles.

During the iterative application of the process new rules may be constructed or at least an initial rule will be updated from the set (that can be empty) of the initial experiments and from the set of new experiments.

The determination of the new experiments may also be performed manually for a part or all of the parameters.

Determination of the new experiments may be performed automatically taking into account at least one of the following criteria in accordance with the particular aspects:
- foreseeable effect of the new experiments on the selected rule (measured by the quality indicators, of which a non-exhaustive list is given in the description of an exemplary embodiment),
- the number of new experiments,
- the cost (individual or cumulative) of the new experiments,
- the feasibility (individual) of the new experiments,
- the distances two-by-two between the initial and new experiments and the distances two-by-two between the new experiments in the application space of the rule.

The process may comprise an additional stage of graphical representation of the rules and the corresponding quality indicators.

The process may also comprise a stage of graphical visualization of the suggested new experiments.

The invention will be better understood from a reading of the following description while referring to non-limiting exemplary embodiments in which:
- The process of the construction of an explanatory model in accordance with an exemplary embodiment of the invention breaks down into different stages:
  - construction of an initial model from a reduced number of available experiments, and
  - improvement of this model by an iterative process with the aim of identifying new experiments that can have a favorable effect on the improvement of the pertinence of the rule or of the set of rules.

Construction Stage of an Initial Model

Turning now to the Drawings in general, the construction of the initial model is realized by a system articulated around the software architecture, an example of which is shown in FIG. 1.

This system is composed of:
- a data access module (1),
- a project management module (2),
- a rule management module (3),
- a module for calculating the values of quality indicators of a rule (4),
- a module for generating a set of rules (5),
- a rule editing module (6),
- a rule optimization module (7)
- a rule comparison module (8), and
- a rule visualization module (9).

A graphical representation of part of these modules is given in FIG. 1.

Data Access Module (1)

Data access module 1 is intended for the reading and recording of data in the form of a software file in an adapted format. This data is the information corresponding to the experiments (also called "examples" or "points") from which the rules are to be created and validated. Each line gives information about the values of the variables (also called "columns"). These variables can be of an ordered nature (e.g., taking numeric values) or of a non-ordered nature (e.g., taking discrete textual values).

This information is constituted, e.g., of an external table comprising for each example values of experiment variables as well as an output variable from which the attempt is made to construct the explanatory model. This output variable is a non-ordered variable in the non-limiting example described. In the case of an application concerning the analysis of the adjustment of a production chain this table will comprise, for a series of experiments, the values of the adjustments for each piece of equipment in the chain as well as the value of performance of measurement indicators collected in the production chain.

Its interface with the user proposes the choice between these options and requests for each of them the input of the corresponding parameters (e.g.: name and path of the file, etc., ... ). Data access module 1 realizes the importing of data in accordance with disparate formats in order to record them in memory.

Project Management Module 2

This project management module 2 accesses historic data via the data access module 1 and accesses the rules via rule management module 3 to record the work projects in the form of files with a specific format.

Rule Management Module 3

This rule management module 3 puts the set of available rules coming from rule editing module 7 or rule generation module 5 at the disposition of the other modules and maintains the coherence of the modified rules by optimization module 6, rule editing module 7 and rule visualization module 9. It maintains the coherence of the quality indicators for each rule by calling the module for the calculation of the values of quality indicators 4.

This module also puts the sets of these rules at the disposition of rule comparison module 8.

In the exemplary embodiment a rule is precisely defined by:
- a conjunction of elementary premises, each elementary premise consisting of a restriction of the domain of a variable:
  - in the form of an interval of variation for an ordered variable,
  - in the form of a particular value for a non-ordered variable, and
- an elementary conclusion also consisting of a restriction of the domain of a variable, which variable should be discreet (non-ordered).

The rule management module performs the recording of these rules in the form of a file with a specific format.

Module for Calculating the Values of Quality Indicators of a Rule (4)

This module permits the calculation of a set of values of quality indicators for each rule from a rule such as is produced by module 3 and from a set of data such as is produced by module 1.

Certain criteria of the quality of the rules are defined relative to a geometric representation of the rules that necessitate several preliminary explanations. It is said of an example that it is "covered" by a rule if it satisfies all the premises of the rule (in particular, a rule without premise covers all the examples). It is said of an example that it is "well-classed" if it satisfies all the conclusions of the rule and that it is "poorly classed" otherwise. "Class" is said of a rule, the set of the examples "well-classed" by the rule.

Given a base of examples and a rule, the following is noted below:

N, the number of examples in the base that are in the class of the rule,
n, the number of examples covered by the rule and well-classed,
k, the number of examples of examples covered by the rule and poorly classed,
K, the number of examples of the base that are not in the class of the rule.

The calculated indicators can be taken in particular from the following indicators:

Size

The indicator of size is the number of examples of the base covered by the rule:

$$I_{Size} = n+k$$

Relative Size

The relative size is an indicator that takes into account the conclusion of the rule. It is calculated as follows: Number of examples that satisfy the premises and the conclusions of the rule/number of examples that satisfy the conclusions of the rule:

$$I_{Relative\ size} = \frac{n}{N}$$

Purity

The degree of purity of a rule is determined by the ratio of the number of examples covered by the rule and well-classed over the total number of examples covered by the rule.

For example, if a rule ending on the value "good" for the output variable contains 5 points (examples) of which 4 have for the value of the output variable the value "good" and 1 point the value "bad", the purity of the rule is ⅘ or 80%.

$$I_{Purity} = \frac{n}{n+k}$$

Complexity

This is the number of variables involved in the premises of the rule.

Number of Controlled Variables

This indicator is defined as the number of controlled variables involved in the premises of the rule.

Number of Non-Controlled Variables

This indicator is defined as the number of non-controlled variables involved in the premises of the rule.

Robustness

The robustness of a rule is a statistical indicator that takes account of the probability according to which this rule could be the result of pure chance. In order to calculate it the following number is used that determines the probability (under the hypergeometric law) of obtaining a rule that has the same relative size (supposing all the equally probably combinations) among those that have the same size:

$$hg(R) = \frac{C_N^n \times C_K^k}{C_{N+K}^{n+k}}$$

A random drawing of rules is then carried out (by drawing pairs of points and calculating the least general rule that covers these points) that is classed by decreasing hypergeometric probability hg(R).

From these latter, a rule is determined such that 10% of the rules have a lesser probability and it is called T.

The following function is then calculated that has the value of ½ when rule R has the same hypergeometric probability as rule T:

$$F(R) = 1 - \frac{1}{2^{\log(hg(R))/\log(hg(T))}}$$

This function is approximately the indicator of robustness. It is sufficient to correct its value when the purity of rule R is lower than that of the base (calculated as the ratio N/(N+K)):

$$I_{robustness}(R) = \begin{cases} F(R), & si\ I_{purity}(R) > \frac{N}{N+K} \\ 2 \times F(R_0) - F(R) & sinon \end{cases}$$

in which $R_0$ is a rule (arbitrary) of the same size as R and of purity $$\frac{N}{N+K}.$$

Relative Volume

The relative volume of the rule is calculated as the product of the relative "volumes" of the domains of each premise. The term "relative volume of a premise" denotes the ratio of the measure of the variation space of the variable involved after restriction to the measure of the total variation space of this variable.

Thus, if a variable V1 can take any real values between 0 and 3 in all the base, the relative volume of a premise of type "V1 between 1 and 2" is ⅓ because the volume of the restriction interval is 1 (=2−1), and the volume of the total variation interval is 3 (=3−0). Likewise, if a variable V2 can take 2 values in all the base: {Good, Bad}, the relative volume of a premise of type "V2=Good" is ½, because the volume of the restriction interval is 1 (a single value), and the volume of the total variation interval is 2 (2 possible values). In these hypotheses the relative value of the rule of the type "If V1 between 1 and 2 and V2=Good, then . . . " is: ⅓·½=⅙.

Density

The density of a rule is calculated as the ratio of its normalized size (size/number of examples in the base) over its relative volume. In the particular case in which the volume is zero the density equals 1.

$$I_{Density} = \frac{I_{size}}{(N+K) \cdot I_{RelativeVolume}}$$

Sensitivity

The sensitivity is determined by the following method.

The sensitivity of a premise is obtained by measuring the difference of purity after disturbance, that is to say, increasing the limits of the variable by 10% (5% to the left and 5% to the right).

The sensitivity of a rule is obtained by taking the maximum of the sensitivities of the premises that it contains.

Interest

The interest is a composite indicator that is calculated as a product of linear combinations of indicators among the previous indicators, whose exact form (that is, the weights assigned to each individual indicator) is determined by the choices made by the user during the definition of the objectives of the study.

Other Indicators

Every combination of the previous indicators can constitute a new indicator.

Module for the Automatic Generation of an Explanatory Model (5)

The module for generating an explanatory model 5 uses the totality or only a part of the data (issued from module 1). The purpose of this module is to manufacture rules that end in an output variable for which the construction of an explanatory model is sought and that are of a sufficient quality relative to the criteria enunciated by the user, putting in play the different indicators defined above. For example, the learning algorithm is used to define rules of a sufficient size and volume, with a good density, a good robustness and/or a good sensitivity.

It is said that a rule generalizes a set of points if it covers these points (its conditions are validated by these points). Given a set of points, the least generalized is the smallest rule (in the sense of inclusion) that generalizes this set.

An iterative process constituted by the following stages is applied in the proposed implementation of the module for generating rules:

Selection of a set of points: A set of points is determined by random drawing among the points still not covered by the rules and whose compatibility is the strongest.

Construction of the least generalized rule: The least generalized rule of the set of points is constructed and evaluated (its quality indicators are calculated).

Expansion of the rule; The rule is modified by expansion in as much as its quality indicators can be improved.

Updating of the indicators of covering and compatibility: The indicators of covering and compatibility (possibility of creating a good rule from these points) are updated.

Finally, an optional stage consists in combining the rules obtained in order to reduce their number by realizing intersections between rules covering the same points and eliminating redundant rules.

Rule Editing Module (6)

This module 6 constitutes a user graphical interface that allows the user to manipulate the rules and to add modifications. The user can select a rule and modify the variation domain of the variables. Module 6 recalculates in real time the quality indicators of the rule and displays the results of the new quality indicators resulting from the modifications imposed by the user. The modifications determined by the user are likewise expressed by a variation of the graphical representation of the quality indicators, e.g., in the form of a variation of the color.

Rule Optimization Module (7)

This optional module permits the optimization of a rule in accordance with a certain number of quality criteria. Its implementation is constituted in the proposed implementation by three distinct stages:

Sub-Stage of the Specification of the Objective of the Optimization

This module permits the specification of the constraints (invariability of premises, minimal or maximal values for the indicators) and of the objectives (maximization, minimization or ignorance) for each of the previously cited indicators.

The user can impose constraints on all or part of the indicators or select all or part of the indicators to be optimized:

For example, the user imposes a threshold value on an indicator or designates an indicator to be maximized or minimized. The threshold value corresponds in the example described to the current value of the indicator for the initial rule. The user can choose to fix this value either as an upper threshold or a lower threshold.

The user can also ignore certain indicators on which no constraint is to be applied in the continuation of the treatments.

Sub-Stage of the Calculation of Optimized Rules

This module performs a search by multi-objective genetic algorithm with constraints of a set of optimal rules for the criteria specified by the user, similar to the rule initially selected and respecting the specified constraints.

The proposed implementation is iterative and consists of the repetition of an algorithmic body that consists, given a set of candidate rules, in carrying out elementary operations of modification on these rules, evaluating their quality as regards the different criteria and constraints and selecting the most satisfactory ones.

One of the particularities of the proposed implementation is the maintaining of two populations (or sets of rules). The one permits the treatments and random searching and the other serves to memorize the best rules (elite population) in order to prevent the interesting rules that were previously found from being lost during the course of the progression of the algorithm.

The management of constraints is carried out in a dynamic manner by relaxing them at the start of the algorithm and progressively increasing their restrictive effect.

Sub-Stage of the Visualization of Suggested Rules

This module permits the rules selected by the algorithm to be represented in graphical form.

These rules are represented in a graphical form on a diagram whose axes correspond to quality indicators selected by the user. Each rule is represented by a graphical sign whose coordinates correspond to the values of the two indicators. This representation allows the user to select one of the optimized rules or several of them, corresponding to an optimal compromise relative to the quality indicators.

The user accesses for each of the rules represented the values of the corresponding quality indicators in the form of a table.

This table also comprises the contribution matrix in which each cell corresponds to the restriction of the domain of a variable for a given rule.

Rule Comparison Module (8)

This module permits the positioning of the rules as a function of the value of two quality indicators selected from the set of quality indicators. Each rule can be positioned on a graph whose axes correspond to the selected quality indicators.

Rule Visualization Module (9)

This module permits the displaying and the manipulating of a graphical representation of a rule. The rule is represented in the form of a projection of a hypercube of points over two variables selected by the user. The contours of the hypercube can be modified and in this instance the rule is dynamically reevaluated. The quality indicators are also recalculated in real time.

Improvement Stage of the Model Constructed from Initial Experiments

The invention comprises, starting from the model constructed in this manner and, if necessary, from the optimized rule, an additional iterative process consisting in determining an optimal set of supplementary experiments in order to improve the model and the pertinence of the rules.

A possible implementation of this iterative process consists of the successive realizing of the following modules:

module for the specification of the experimental domain (10),
module for the automatic determination of the experiments to be realized (11),
module for the visualizing of the experiments to be realized (12),
model for inputting the experiment results (13), and
module for updating the explanatory model (14).

Module for the Specification of the Experimental Domain (10)

This module consists of a graphical assistant for which an exemplary embodiment is given (FIG. 6) that permits the user to specify the variables that are made to vary in the experiments (selection in the boxes to be checked 15) and the domain of possible variation of each of these variables 16, that can be determined by an interval 17 or a list of numeric 18 or textual 19 values.

Figure 7:
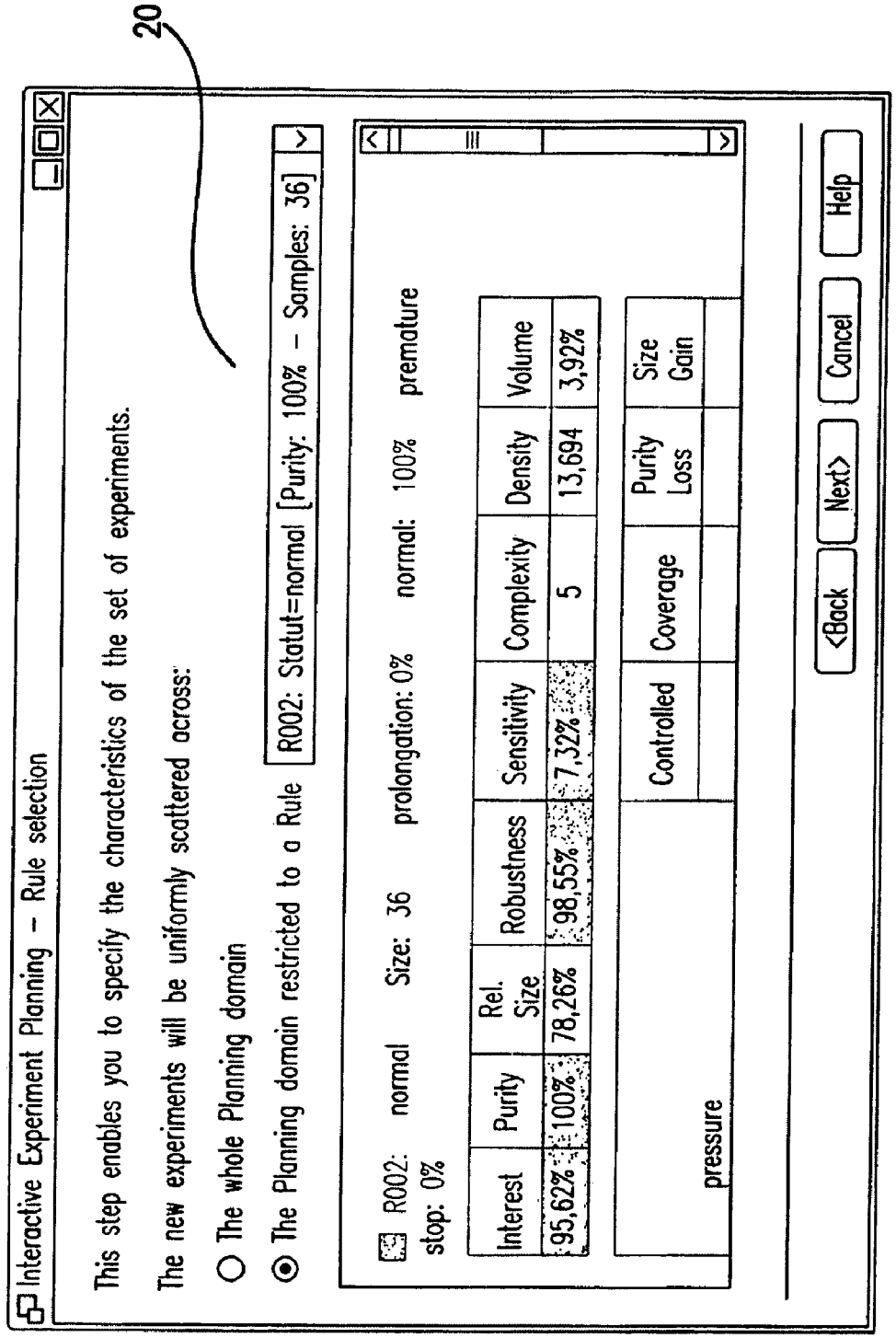
FIG. 7 is a computer screen showing an optional module.

An optional stage (shown in FIG. 7) permits the automatic defining of the restriction of the experiment domain by selecting a rule 20 from the set of rules constituting the explanatory model.

Module for the Automatic Determination of the Experiments to be Realized (11)

An important element of the invention is constituted of the algorithm for the automatic determination of the experiments to be performed. The set of the possible adjustments of the process can be represented by a space in which each dimension corresponds to an adjustment. In this space a hypercube characterizes the set of acceptable configurations. It is possible that a certain number of experiments have already been performed. These experiments are represented by points in this hypercube. The new experiments to be performed will also be represented by points. The goal is then to find a distribution of these latter that permits a good exploration, that is to say, as exhaustive as possible, of the hypercube of possible configurations.

More precisely, a hypercube A (domain of study) and a set H of h points of A (historical samples) are considered.

A set P of n points of A (future experiments) is to be found such that the (n+h) points are distributed as uniformly as possible (see the illustration in FIG. 2).

Once the problem has been posed in this manner it is necessary to choose on the one hand a criterion on that permits the measuring of the uniformity of the distribution of points and on the other hand an effective method for optimizing this criterion.

In an embodiment of the invention a criterion based on the distances between points is used.

A certain number of constraints is added to this criterion that have the purpose of guaranteeing the uniformity of the distribution of the points in projection on each of the dimensions.

Finally, the proposed realization is based on an algorithm for searching for a solution by local optimization.

Dispersion Criterion

The dispersion criterion used is:

$$U(P) = \left( \sum_{x \in P, y \in P \cup H, x \neq y} \|x - y\|_q^{-p} \right)^{-1}$$

$$avec \ \|x - y\|_q = \left( \sum_{j \ ordonnée} |x_j - y_j|^q + \sum_{j \ non \ ordonnée} 1_{x_j = y_j} \right)^{1/q}$$

Key: avec=with
ordonnee=ordered
non ordonnee=non-ordered

The problem therefore comes down to finding a plane of maximal dispersion.

Constraints

Since it is necessary to apply the adequate affine transformation, it can be supposed that the area of variation of all the control variables is [0; 1]. In these conditions the following constraints are imposed:

Continuous ordered variable: The possible values are selected solely in $\{0, 1/(n+k-1), \ldots, (n+k-2)/(n+k-1), 1\}$ (with k, positive integer). A value can not be taken twice. For k=0, it is a matter of the constraint of the Latin hypercube planes.

Non-ordered variable: The number of occurrences of each category in the historical samples and the future experiments is greater than the entire part of (n+h)/N (in which N is the number of categories).

Figure 3:
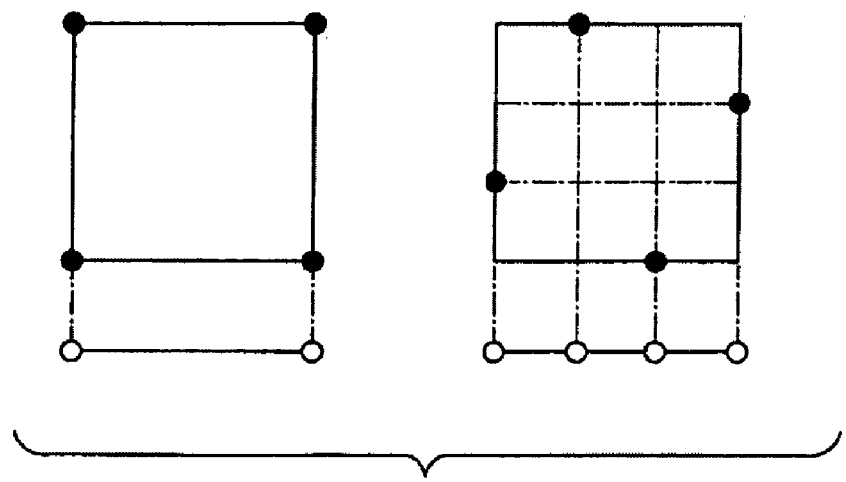
FIG. 3 is a schematic pair of two-dimensional point distributions.

Consider the example of FIG. 3 in dimension 2 (n=4, k=0, h=0).

Standard plane (FIG. 3, left): Very good global distribution, projection on one bad dimension.

Latin hypercube plane (FIG. 3, right): good global distribution, projection on one satisfactory dimension.

Constraint reduces the global dispersion but allows the danger of a bad distribution on certain dimensions to be avoided. It also permits a return to a problem of discrete optimization.

In the majority of cases k=0 can be taken. However, k must be, e.g., strictly positive in the following case: A single continuous ordered variable, no non-ordered variable and H ∩ $\{0, 1/(n-1), \ldots, (n-2)/(n-1), 1\} \neq \emptyset$. In this situation, if k=0, the dispersion is zero. This suggests using $(n+k)^{dim} \geq n+h$ (with dim, number of variables of the experimental domain).

Algorithm

Figure 4:
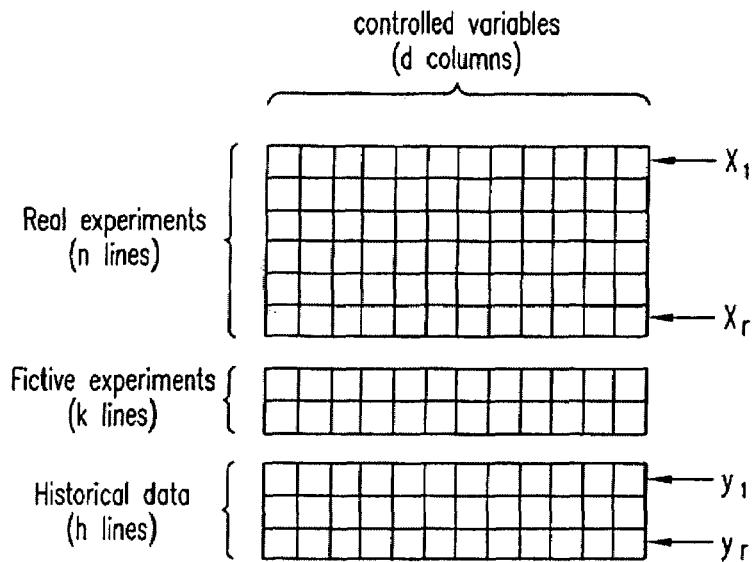
FIG. 4 is a schematic representation of a plane of experiments.

A plane of experiments is represented by the matrix of experiments, a matrix with n lines and d columns (d is the number of controlled variables). This is shown in FIG. 4.

A matrix of fictive data allows a ready manipulation of the constraint on the continuous variables: The values taken in the course of the experiments (real or fictive) are exactly $\{0, 1/(n+k-1), \ldots, (n+k-2)/(n+k-1), 1\}$.

The proposed algorithm follows the following principle:
Start from a suitable initial configuration
As long as the dispersion increases
    For a sequence of transformations
        Test the transformation
        Operate the transformation if the dispersion increases.

This principle involves in particular:
The dispersion is always increasing during the course of the algorithm.
The solution found at the end of the algorithm is a local minimum.

To obtain better solutions the algorithm can be started from several different initial configurations.

A suitable initial configuration is any configuration verifying the constraints.

The possible transformations are:
Columns of a continuous variable: Exchange of a "real experiment" box and an "experiment" box.
Columns of a discrete variable: Exchange of a "real experiment" box and a "real experiment" box.

Figure 5:
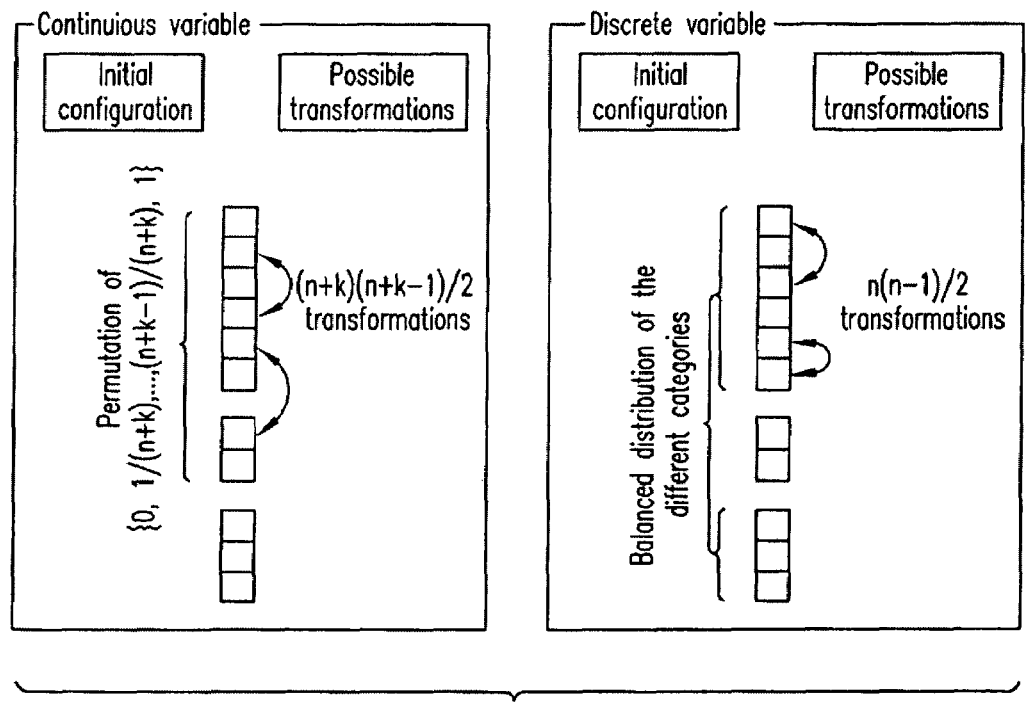
FIG. 5 is a pair of diagrams showing behavior of columns for continuous and discrete variables.

FIG. 5 summarizes the behaviors of the columns for the continuous variables and the discrete variables.

The following parameters are used in the proposed implementation:
Parameters of the dispersion function: p (=8), q (=2, Euclidean distance)
Value of $k(=0$ or $\max((n+h)^{1/dim}-n, 0))$
Sequence of transformations (all the possible exchanges of two boxes for all the columns in a random order).

The specification of additional parameters by the user (number of experiments to be performed and search depth) can be carried out by the graphical interface shown in FIG. 8.

Figure 9:
FIG. 9 is a computer screen showing remaining time during operation of an algorithm in accordance with aspects of the invention.

During the operation of the above algorithm a visualization of the progression (comprising an estimation of the remaining calculation time) is given in FIG. 9.

Module for Visualizing Experiments to be Performed (12)

Figure 10:
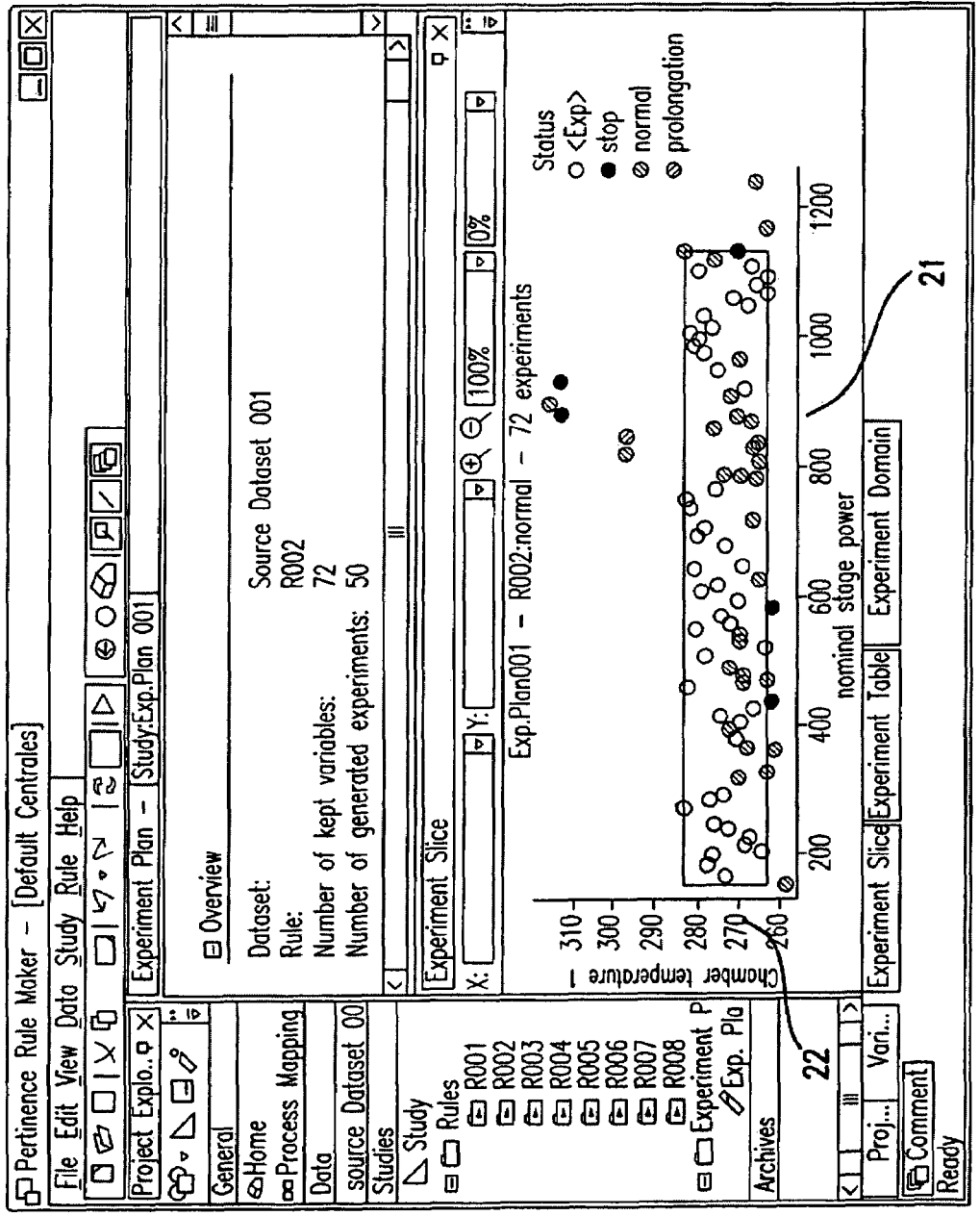
FIG. 10 is a computer screen showing the module for visualizing rules.

The experiments generated can be visualized in several manners. A representation in the form of a table can be given (FIG. 12) or, more advantageously, a graphical representation similar to that of the module for visualizing rules 9 is possible, as FIG. 10 illustrates. In this representation the set of historical and newly suggested experiments are visualized along two axes 21-22 selected by the user. A color code is used to distinguish the experiments: Those having been performed are marked by the color corresponding to their output value whereas the newly suggested experiments are marked by a unique and distinct color.

Module for Inputting the Experiment Results (13)

This module is based on data access module 1. Once the experiments are implemented in the industrial process, e.g., the associated values of the output variable are collected and entered into an adapted software system. Module 1 can therefore access it and import these results into the system in order that each of the performed experiments is added to the list of historical experiments.

Module for Updating the Explanatory Model (14)

During the collection of the newly realized experiment results the indicators of the rules of the explanatory model are automatically updated.

From these new indicators, the user can decide to update the explanatory model.

An implementation of this updating consists in using one or several of modules 3 to 9.

Figure 13:
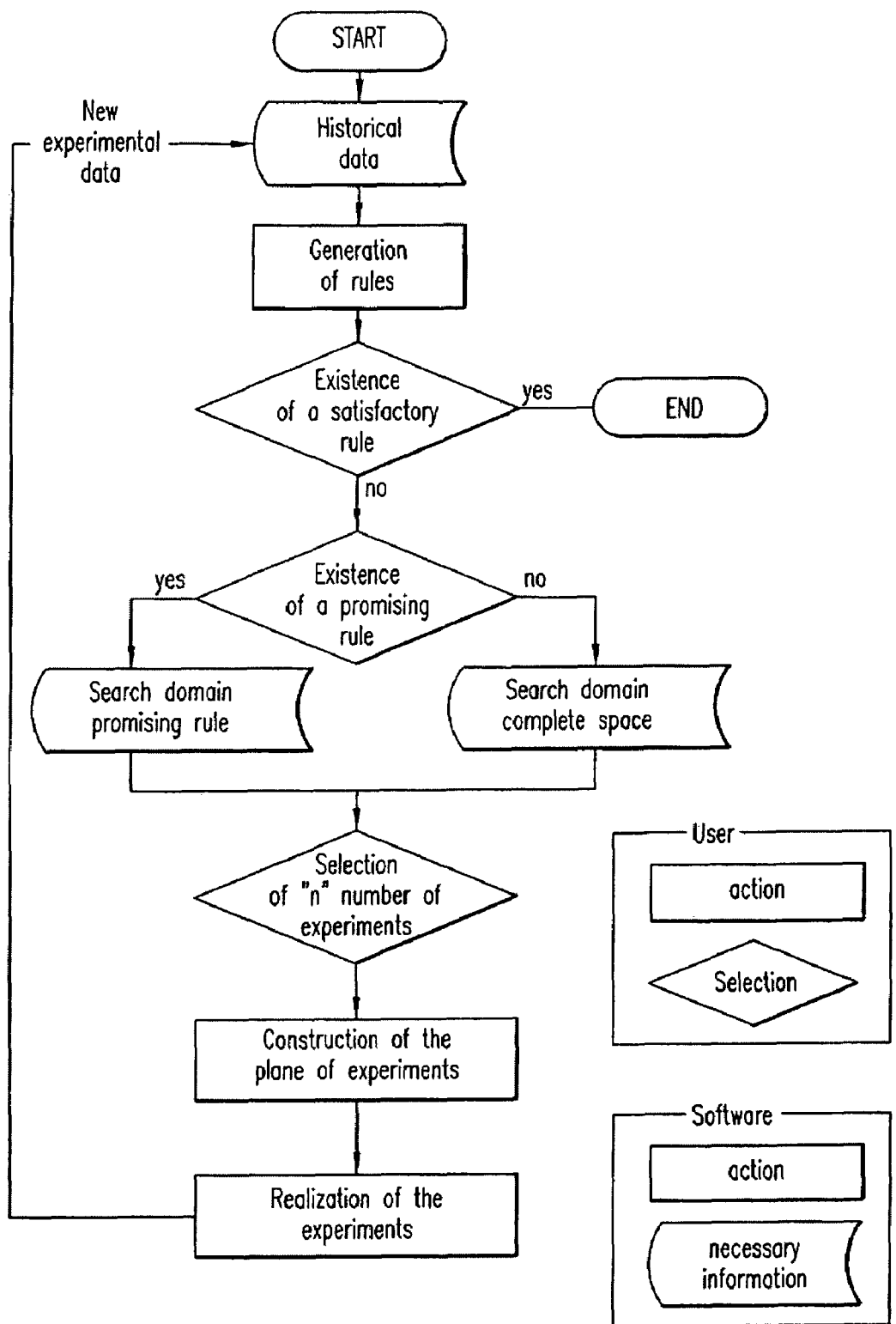
FIG. 13 is a flow diagram of updating the explanatory model.

Once the explanatory model has been updated in a satisfactory manner (in view of the corresponding indicators), the present state (modules 10 to 14) can be repeated. This operation is illustrated in FIG. 13.

The invention claimed is:

1. A method implemented by a computer programmed as a rule generation apparatus for iterative construction of an explanatory model of an industrial process, the method comprising:
    determining, by a processor of the computer, based on experimental data obtained from the industrial process, a rule in the explanatory model that explains at least a part of the experimental data;
    displaying the determined rule to a user and allowing the user to modify the rule;
    determining a set of new experiments for evaluating the rule;
    conducting the determined new experiments to obtain corresponding results;
    calculating at least one quality indicator that indicates a quality of the determined rule based on the corresponding results of the experiments; and
    determining whether the at least one quality indicator satisfies predetermined conditions for including the rule in the explanatory model of the industrial process.

2. The method according to claim 1, further comprising:
    determining new rules from initial experiments and from the new experiments when the at least one quality indicator is not satisfactory.

3. The method according to claim 1, further comprising:
    modifying at least one initial rule determined from initial experiments and from the new experiments when the at least one quality indicator is not satisfactory.

4. The method according to claim 1, wherein an initial set of rules is empty.

5. The method according to claim 1, wherein the steps of determining new experiments and conducting new experiments are repeated until the at least one quality indicator satisfies the predetermined conditions.

6. The method according to claim 1, wherein the steps of determining new experiments and conducting new experiments are repeated as long as the at least one quality indicator improves between two cycles.

7. The method according to claim 1, wherein the step of determining new experiments is realized manually for certain experiments of the new experiments.

8. The method according to claim 1, wherein the step of determining new experiments is performed, at least for certain experiments, by maximizing a foreseeable effect of the new experiments on the rule.

9. The method according to claim 1, wherein the step of determining new experiments is performed taking account of a parameter representative of an expense of the new experiments.

10. The method according to claim 1, wherein the step of determining new experiments is performed taking account of a parameter representative of feasibility of the new experiments.

11. The method according to claim 1, wherein the step of determining new experiments is performed at least for certain experiments by maximizing a compromise between a foreseeable effect of the new experiments on the rule and a number of new experiments.

12. The method according to claim 1, wherein the step of determining new experiments is performed at least for certain experiments by maximizing a compromise between a foreseeable effect of the new experiments on the rule and a cumulative expense of the new experiments.

13. The method according to claim 1, wherein the step of determining new experiments is performed at least for certain experiments by maximizing distances two-by-two between initial experiments and the new experiments in an application space of the rule.

14. The method of claim 1, wherein the at least one quality indicator includes a quality indicator indicating one of an interest, purity, relative size, robustness, sensitivity, complexity, density, and volume of the rule.

15. The method of claim 1, wherein the at least one quality indicator includes a purity of the rule.

16. The method of claim 1, wherein the at least one quality indicator includes a robustness of the rule.

17. The method of claim 1, wherein the at least one quality indicator includes a complexity of the rule.

18. The method of claim 1, wherein the at least one quality indicator includes a volume of the rule.

19. The method of claim 1, wherein the at least one quality indicator includes a density of the rule.

* * * * *